(12) United States Patent
Bush

(10) Patent No.: US 9,642,339 B2
(45) Date of Patent: May 9, 2017

(54) ANIMAL TREAT DELIVERY SYSTEM

(71) Applicant: Geoffrey Arthur Bush, San Jose, CA (US)

(72) Inventor: Geoffrey Arthur Bush, San Jose, CA (US)

( * ) Notice: Subject to any disclaimer, the term of this patent is extended or adjusted under 35 U.S.C. 154(b) by 87 days.

(21) Appl. No.: 14/520,133

(22) Filed: Oct. 21, 2014

(65) Prior Publication Data

US 2015/0107521 A1   Apr. 23, 2015

Related U.S. Application Data

(60) Provisional application No. 61/893,527, filed on Oct. 21, 2013.

(51) Int. Cl.
*A01K 15/02* (2006.01)

(52) U.S. Cl.
CPC .................................. *A01K 15/025* (2013.01)

(58) Field of Classification Search
CPC ..... A01K 15/02; A01K 15/025; A01K 15/026
USPC .......................................... 119/702, 707–711
See application file for complete search history.

(56) References Cited

U.S. PATENT DOCUMENTS

| | | | | |
|---|---|---|---|---|
| 3,830,202 A * | 8/1974 | Garrison | ............. | A01K 15/025 119/709 |
| 4,802,444 A * | 2/1989 | Markham | ............. | A01K 13/00 119/709 |
| 4,948,137 A * | 8/1990 | Alvarez | ............. | A01K 15/025 119/708 |
| 5,111,771 A * | 5/1992 | Mathews | ............. | A01K 15/025 119/708 |
| 5,904,118 A * | 5/1999 | Markham | ............. | A01K 15/025 119/707 |
| 6,401,665 B1 * | 6/2002 | Gentile | ................ | A01K 15/025 119/707 |
| 6,688,258 B1 * | 2/2004 | Kolesar | ................ | A01K 5/0114 119/702 |
| 7,543,550 B2 * | 6/2009 | Simpson | ............. | A01K 15/025 119/708 |
| 8,201,521 B2 * | 6/2012 | Shirley | ................... | A01K 5/00 119/51.03 |
| 8,276,547 B2 * | 10/2012 | Markham | ............. | A01K 15/026 119/709 |
| 2006/0266299 A1 * | 11/2006 | DiAntonio | ........... | A01K 15/025 119/708 |
| 2009/0000565 A1 * | 1/2009 | Bryce | .................. | A01K 15/025 119/707 |

(Continued)

OTHER PUBLICATIONS

Kong, "Extreme Goodie Bone," available at http://web.archive.org/web/20120620213408/http://www.kongcompany.com/products/for-dogs/rubber-toys/extreme-rubber-toys/extreme-goodie-bone/ (Jun. 20, 2012).*

*Primary Examiner* — Lisa Tsang
(74) *Attorney, Agent, or Firm* — Plager Schack LLP

(57) ABSTRACT

An animal treat delivery system is configured to hold a treat and dispense the treat to an animal. The animal treat delivery system includes a rounded top portion joined to an expansionary central portion. A truncated lower portion is joined to the expansionary central portion. A rope channel is bored into the top portion. A treat compartment is bored into the truncated lower portion and the expansionary central portion. The rounded top portion is configured to swing in air such that maneuvering the treat compartment enables obtaining the treat by the animal.

5 Claims, 7 Drawing Sheets

(56) References Cited

U.S. PATENT DOCUMENTS

2009/0277395 A1\* 11/2009 Jager .................... A01K 15/025
   119/707
2011/0139815 A1\* 6/2011 Benson ................ A01K 5/0114
   119/51.01

\* cited by examiner

ANIMAL TREAT DELIVERY SYSTEM

RELATED APPLICATION

This application claims priority to provisional patent application U.S. Ser. No. 61/893,527 filed on Oct. 21, 2013, the entire contents of which is herein incorporated by reference.

BACKGROUND

The embodiments herein relate generally to animal toys and training.

Prior to embodiments of the disclosed invention, it was difficult to keep an animal engaged with a treat puzzle for as long as possible. If the puzzle is too difficult, the animal would give up. If the treat puzzle was too easy to get the treat, then puzzle lacked challenge and the toy was merely a means to feeding the dog. Embodiments of the present invention solve these problems.

SUMMARY

An animal treat delivery system is configured to hold a treat and dispense the treat to an animal. The animal treat delivery system includes a substantially closed rounded top portion joined to an expansionary central portion. A truncated lower portion is joined to the expansionary central portion. A rope channel is bored into the top portion. A treat compartment is bored into the truncated lower portion and the expansionary central portion. A plurality of ridges is on an inner portion of a hollow portion of the treat compartment. Each of the ridges thickens from an upper portion of the treat compartment to a lower portion of the treat compartment creating a plurality of channels therebetween. A lower portion has a contracting cross sectional area terminating at an opening of the treat compartment. The rounded top portion is configured to swing in air such that maneuvering the treat compartment enables obtaining the treat by the animal.

In some embodiments the animal treat delivery system can further comprise a rope further comprising a knot at a first end and a clasp at a second end. The rope can be threaded through the rope channel and is further attached above ground in order to swing the animal treat delivery system.

In some embodiments, the treat compartment can further comprise a treat compartment ceiling. The treat compartment ceiling can be configured to accommodate a washer on the rope proximate the knot in order to increase stability of the animal treat delivery system.

In some embodiments, the treat compartment can further comprise a plurality of ridges. The plurality of ridges can be configured to accommodate an edible paste as the treat for the animal.

In some embodiments, a plurality of cavities can be on the truncated lower portion. This can increase rotational motion of the truncated lower portion while swinging.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
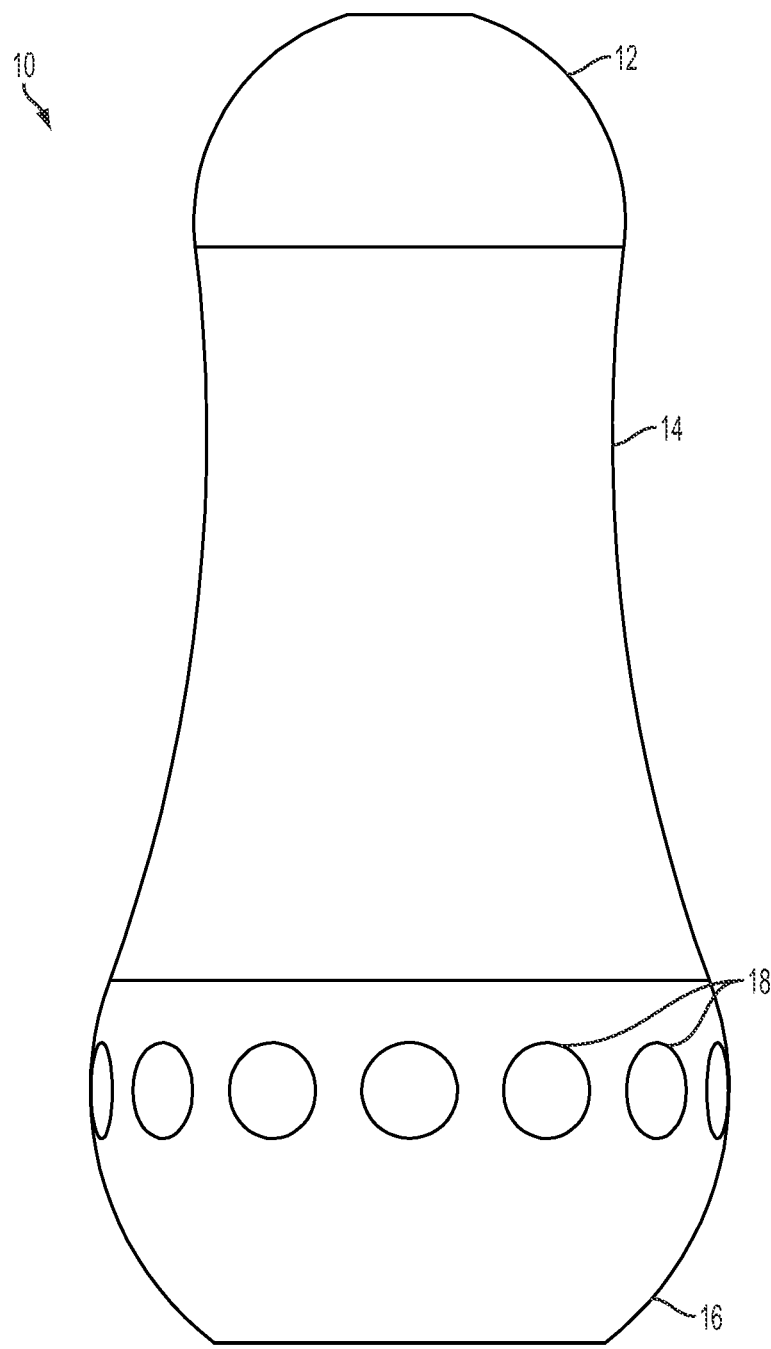
FIG. 1 shows a front view of one embodiment of the present invention.

By way of example, and referring to FIG. 1, one embodiment of animal treat delivery system 10 comprises rounded top portion 12 joined to expansionary central portion 14. Expansionary central portion 14 is joined to truncating lower portion 16. In some embodiments, truncated lower portion 16 comprises a plurality of cavities 18 which can be effective for causing animal treat delivery system 10 to spin as shown in more detail below.

Figure 2:
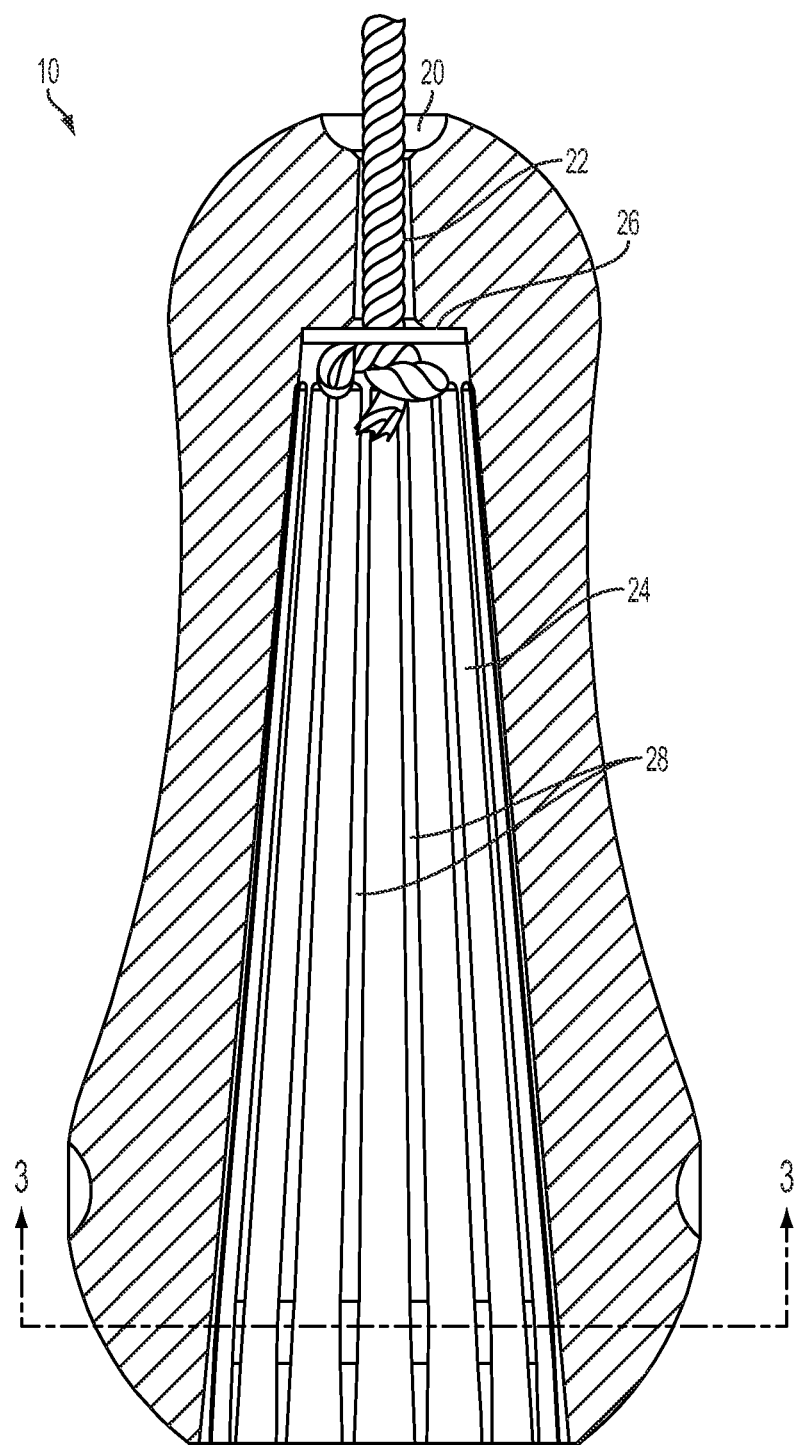
FIG. 2 shows a section view of one embodiment of the present invention.
Figure 3:
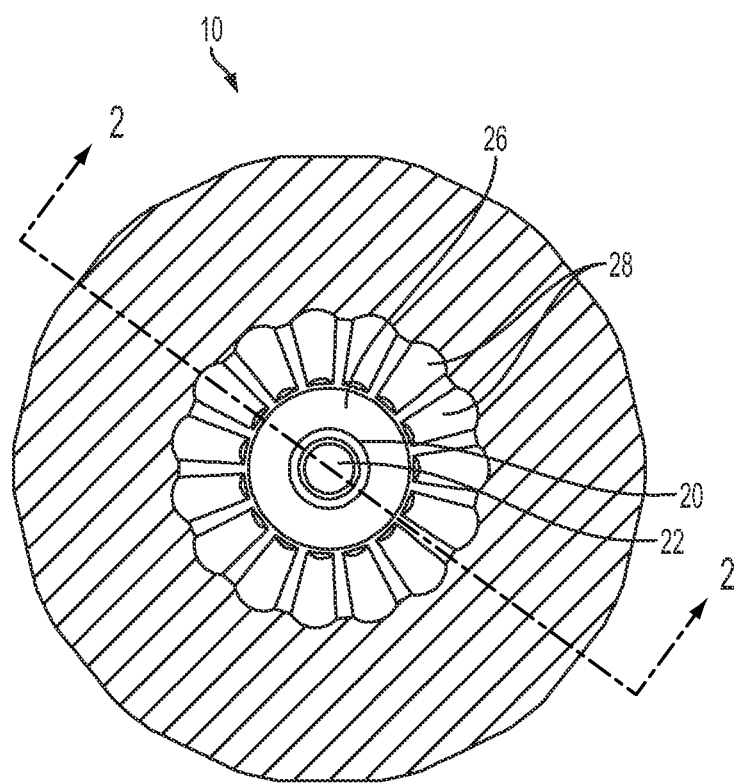
FIG. 3 shows a section view of one embodiment of the present invention.

Turning to FIG. 2 and FIG. 3, rounded top portion 12 is bored with upper rounded top portion 12 rope exit 20 which is immediately adjacent to rope channel 22. Rope channel 22 is immediately adjacent to treat compartment 24 which extends through expansionary central portion 14 and truncating lower portion 16 and is expansionary from expansionary central portion 14 to truncating lower portion 16. Treat compartment 24 is larger than rope channel 22 and possesses treat compartment ceiling 26 and a plurality of ridges 28.

Figure 4:
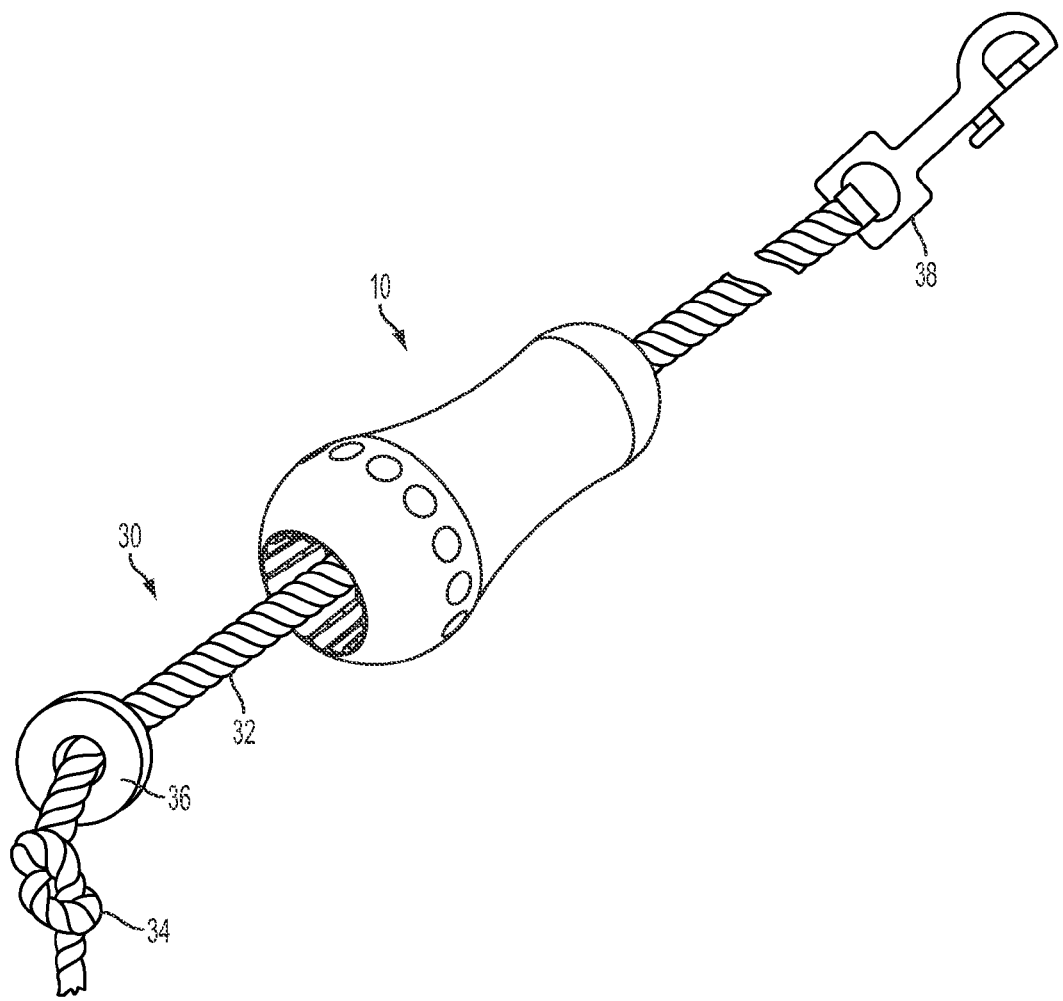
FIG. 4 shows a perspective assembly view of one embodiment of the present invention.

As shown in FIG. 4, rope assembly 30 further comprises rope 32 which is tied into knot 34 at a first end and then threaded through treat compartment 24, rope channel 22 and then rope exit 20. Proximate knot 34 is washer 36 which has an inner diameter larger than that of rope 32 but small than that of knot 32 in order to be applied flush against treat compartment ceiling 26. A second end of rope 32 is mechanically coupled to clasp 38.

Figure 5:
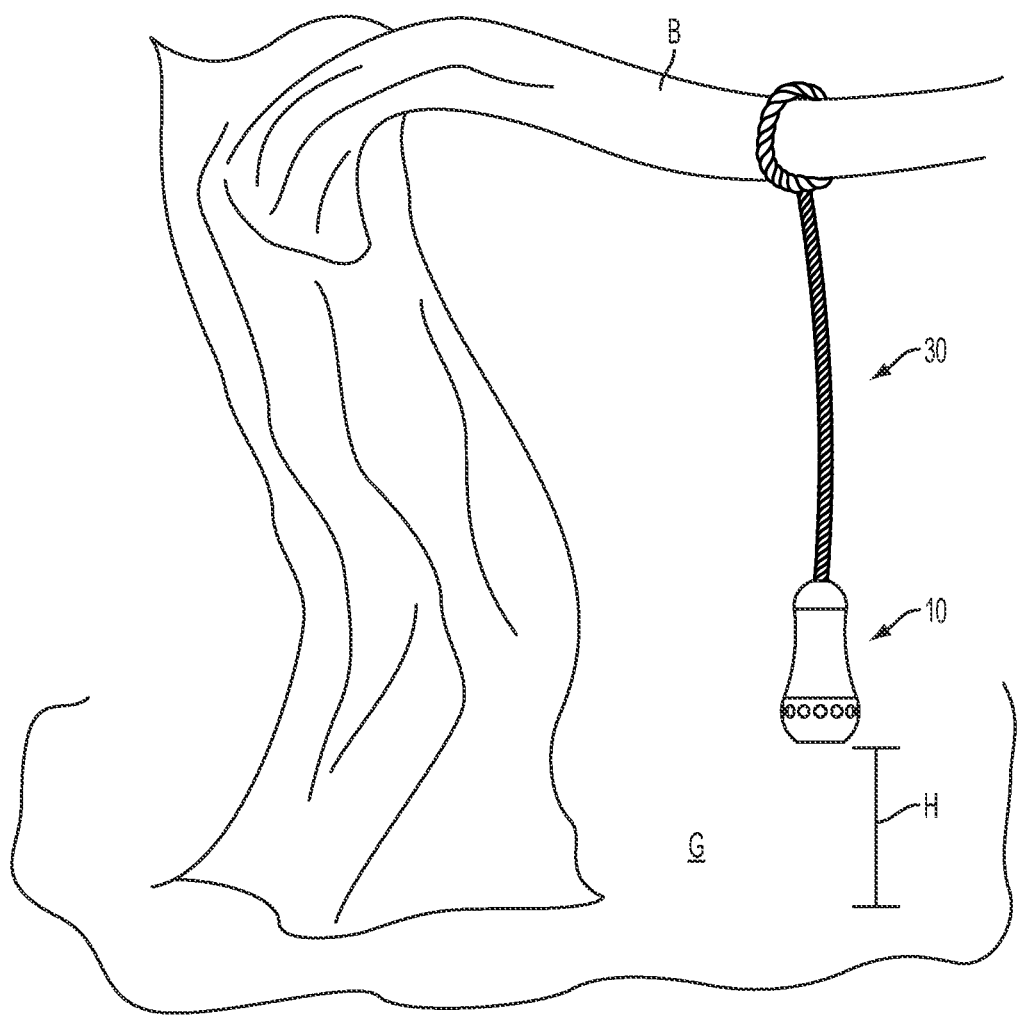
FIG. 5 shows a front view of one embodiment of the present invention in use.
Figure 6:
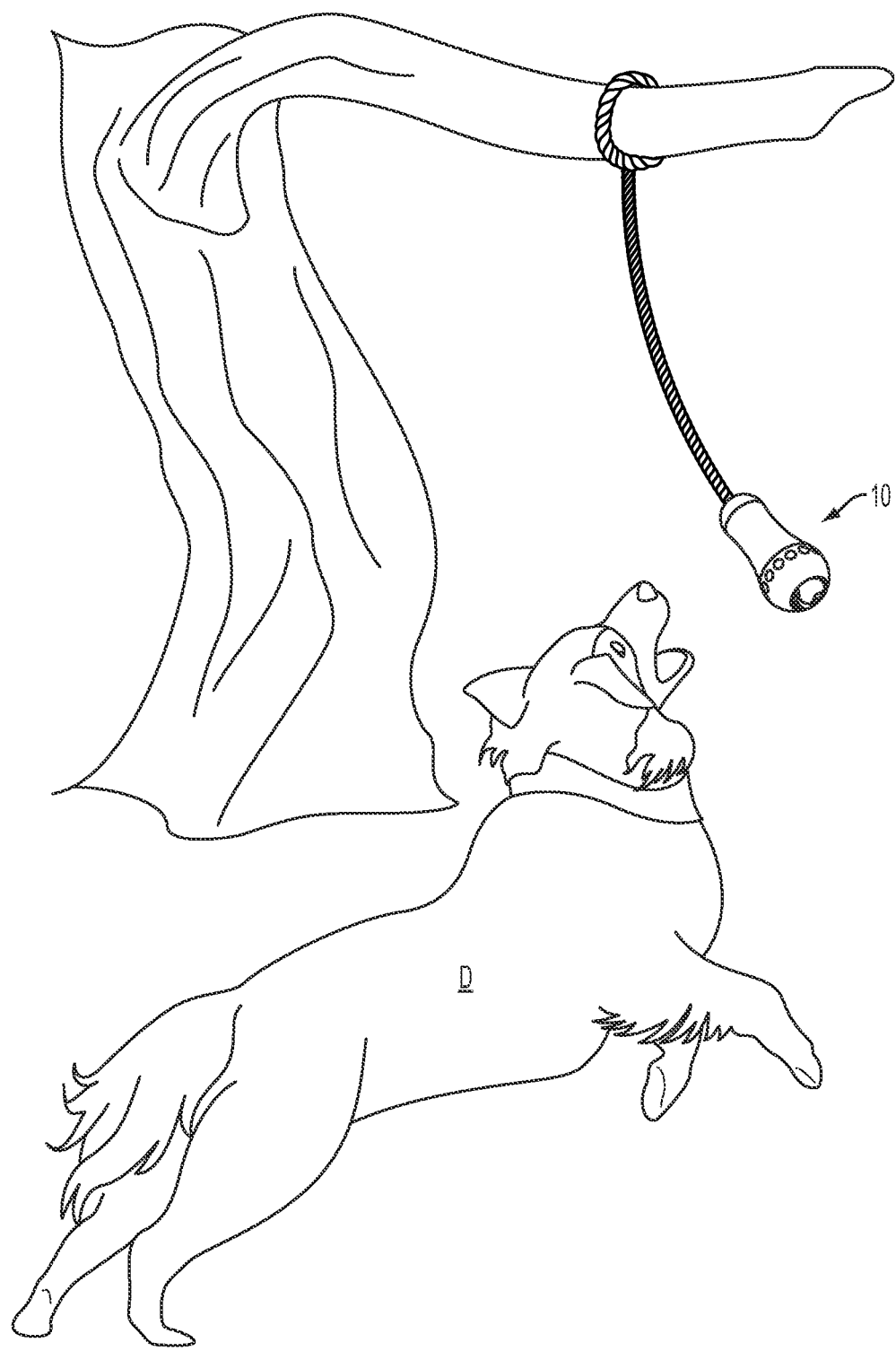
FIG. 6 shows a front view of one embodiment of the present invention in use.
Figure 7:
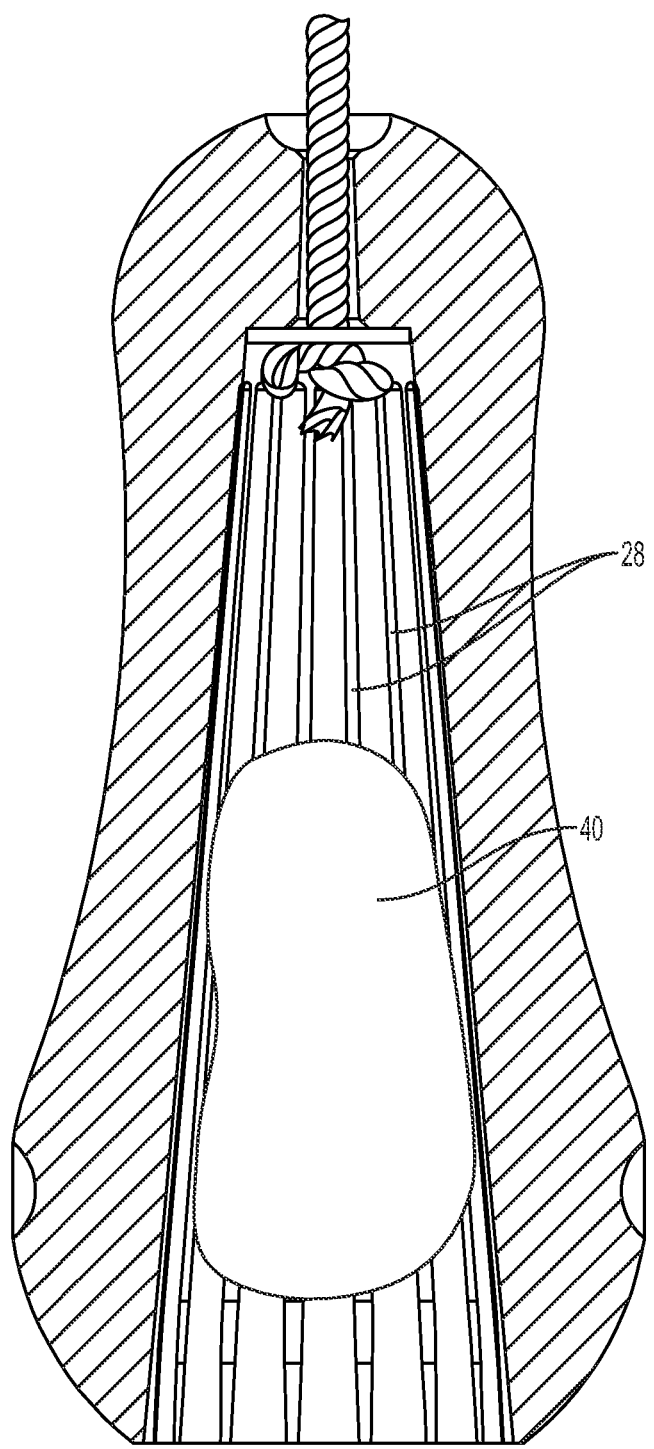
FIG. 7 shows a section view of one embodiment of the present invention in use.

To assemble animal treat delivery system 10 for use, as shown in FIG. 5, a user wraps clasp 38 around branch B of tree T or anything else above the ground that his relatively stationary. Then clasp 38 is connected to rope 32 such that rope 32 is firmly connected to branch B. Use is shown in FIG. 6, animal D when standing on four legs has a height H from ground to nose. The bottom of truncating lower portion 16 is arranged height H as well. Animal treat delivery system 10 is level with the nose of animal D, it is loaded with treat 40. For best results, an edible paste such as peanut butter is recommended as the treat because it readily adheres to the inner cavity and is highly desirable as a treat by most dogs.

As shown in FIG. 6, playtime begins when the dog is presented to the swinging animal treat delivery system 10. Removing the treat from the swinging animal treat delivery system 10 is tricky and will occupy most dogs for a substantial period of time, perhaps an hour or longer.

In some embodiments, animal treat delivery system 10 can be made from a firm elastomeric substance that is flexible but sturdy like hard rubber and having a smooth outer surface and a convoluted inner surface forming the cavity and openings at each end. In some embodiments, rope is a length of braided rope composed of nylon.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. An animal treat delivery system, configured to hold a treat and dispense the treat to an animal, the animal treat delivery system comprising:
    a substantially closed rounded top portion joined to an expansionary central portion;
    a truncated lower portion joined to the expansionary central portion;
    a rope channel bored into the top portion;
    a treat compartment bored into the truncated lower portion and the expansionary central portion; and
    a plurality of ridges, on an inner portion of a hollow portion of the treat compartment and aligned along a longitudinal direction of the treat compartment; wherein each of the ridges has an expansionary cross sectional area extending from an upper portion of the treat compartment to a lower portion of the treat compartment, creating a plurality of channels therebetween; each of the ridges further comprises:
    a lower portion in the lower portion of the treat compartment with a contracting cross sectional area terminating at an opening of the treat compartment;
    wherein the animal treat delivery system is configured to swing in air such that maneuvering the animal treat delivery system enables obtaining the treat by the animal.

2. The animal treat delivery system of claim 1, further comprising: a rope further comprising a knot at a first end and a clasp at a second end, wherein the rope is threaded through the rope channel and is further attached above ground in order to swing the animal treat delivery system.

3. The animal treat delivery system of claim 2, wherein the treat compartment further comprises: a treat compartment ceiling, wherein the treat compartment ceiling is configured to accommodate a washer on the rope proximate the knot in order to increase stability of the animal treat delivery system.

4. The animal treat delivery system of claim 2, wherein the plurality of ridges are configured to accommodate an edible paste as the treat for the animal.

5. The animal treat delivery system of claim 2, further comprising a plurality of cavities on the truncated lower portion in order to increase rotational motion of the truncated lower portion while the animal treat delivery system is swinging.

* * * * *